United States Patent [19]
Brown

[11] Patent Number: 5,865,101
[45] Date of Patent: Feb. 2, 1999

[54] COOKING PAN LID AND COOKING DEVICE INCORPORATING SAME

[75] Inventor: Charles A. Brown, Dallas, Pa.

[73] Assignee: Legion Industries, Inc., Dallas, Pa.

[21] Appl. No.: 80,982

[22] Filed: May 19, 1998

[51] Int. Cl.[6] .............................. A47J 27/00; A47J 37/00; A47J 37/10

[52] U.S. Cl. ................................ 99/340; 99/403; 99/410; 99/444; 99/446; 126/20; 126/373; 126/384; 220/369; 220/731; 220/912

[58] Field of Search .............. 99/339, 340, 341, 99/342, 375, 393, 400, 397, 401, 409, 410, 415, 417, 418, 423, 424, 425, 444–446, 449, 470, 516, 534, 403; 126/20, 369, 373, 381, 384, 385; 219/433, 436, 438, 439, 430, 431, 440, 447, 463, 467; 220/231, 369, 731, 912, 902, 256, 287, 374; 426/523

[56] References Cited

U.S. PATENT DOCUMENTS

| | | | |
|---|---|---|---|
| 3,553,427 | 1/1971 | Filipak | 219/463 |
| 3,931,495 | 1/1976 | Dzaack et al. | 219/467 X |
| 4,126,087 | 11/1978 | McLamb | 99/444 X |
| 4,482,077 | 11/1984 | Henderson | 220/374 |
| 4,700,689 | 10/1987 | Speker | 126/384 |
| 4,805,587 | 2/1989 | Schweitzer | 99/340 |
| 4,829,158 | 5/1989 | Burnham | 126/21 A |
| 5,012,071 | 4/1991 | Henke | 220/369 |
| 5,251,542 | 10/1993 | Itoh et al. | 99/403 |
| 5,465,654 | 11/1995 | Lampi et al. | 220/912 X |
| 5,531,354 | 7/1996 | Uy | 220/731 |
| 5,724,885 | 3/1998 | Uy | 220/369 X |
| 5,727,451 | 3/1998 | DeMars | 99/444 X |

OTHER PUBLICATIONS

Crown Food Services Equipment Ltd., Model GTS–30 and GTS–40 Gas Tilting Skillet, date unknown.

Crown Food Service Equipment Ltd. Model ELTS–30 and ELTS–40 Electric Tilting Skillet, date unknown.

Vulcan–Hart Co., Model Ee30TB and E40TB Braising Pans, date unknown.

Market Forge Industries, Inc. Models 30–STEM, 40–STEM, 30–STEL and 40–STEL UniVerse Tilting Skillets, 1996.

Market Forge Industries, Inc. Models 30–STGM, 40–STGM, 30–STGL and 40–STGL UniVerse Tilting Skillets, 1996.

(List continued on next page.)

*Primary Examiner*—Timothy F. Simone
*Attorney, Agent, or Firm*—Caesar, Rivise, Bernstein, Cohen & Pokotilow, Ltd.

[57] ABSTRACT

A cooking device including cooking chamber, e.g. abraising pan, and a lid pivotally mounted to the chamber and arranged to be raised from a closed position to an open position and vice versa. The chamber includes plural sidewalls, each having a top edge lying in a common plane. The lid includes a top wall with an apron projecting downwardly from the top wall along the front and sides of its periphery. A pair of handles to raise and lower the lid are provided on the sides of the apron. A drip shield projects upward at an angle to the top wall of the lid along a rear portion of the periphery of the lid. The drip shield has a lower free edge which is spaced above the top edge of the cooking chamber when the lid is in the closed position to form a vent for excess steam to exit from the cooking chamber. The apron forms a convection flow space between it and the sidewalls of the cooking chamber. The convection flow space is in communication with the excess steam vent, whereupon air may enter between the apron and the sidewalls of the cooking chamber and flow in a convection flow path to cool the apron. Excess steam produced by the operation of the cooking device is carried through the vent by the convention current flowing through the flow path. The drip shield enables a portion of excess steam to condense on the drip shield for collection and removal. A torque tube is provided extending along but spaced from the drip shield to prevent twisting of the lid when it is raised and lowered. A spring operated piston is provided to facilitate raising and lowering of the lid.

24 Claims, 3 Drawing Sheets

OTHER PUBLICATIONS

Groen (Dover Industries Company) Model CFPC/2 Braising Pan, Dec. 1993.

Groen (Dover Industries Company) Model HFP/2 Braising Pan, Mar. 1995.

Groen (Dover Industries Company) Model FPC/2 Braising Pan, May 1995.

Cleveland Range, Inc. Models SGL–30–T, SGL–40–T, SGM–30–T and SGM–40–T Gas Tilting Open Base And Modular Skillets, date unknown.

Cleveland Range, Inc. Models SEL–30–T, SEL–40–T, SEM–30–T and SEM–40–T Electric Tilting Open Base And Modular Skillets, date unknown.

Southbend (a Middleby Company) Models BEMTS–30 and BEMTS–40 Braising Pans, date unknown.

Southbend (A Middleby Company) Models BGMTS–30 and BGMTS–40 Braising Pans, date unknown.

Southbend (A Middleby Company) Models BECT–24, BECT–30 and BECT–40 Braising Pans, date unknown.

Legion Industries, Inc. Model TES Tilting Braising Pan, date unknown.

Legion Industries, Inc. Model TGSM/TGSE Tilting Braising Pan, date unknown.

COOKING PAN LID AND COOKING DEVICE INCORPORATING SAME

BACKGROUND OF THE INVENTION

This invention relates to cooking devices, in general, and, more particularly, to cooking devices, e.g., braising pans, including a lid which is particularly adapted to the food service industry.

The food service industry involves the preparation of substantial quantities of food for consumption by a large number of people. In my U.S. Pat. No. 5,553,531, which is assigned to the same assignee as this invention and whose disclosure is incorporated by reference herein, there is disclosed a multi-functional cooking device for the food service industry. That multifunction cooking device overcomes many of the disadvantages of the prior art individual cooking devices, rendering it particularly suitable for use in restaurants, cafeterias, hospitals, schools, colleges, prisons, airports, etc. The device of that patent combines a steamer, skillet, griddle, fryer, kettle, holding cabinet and oven into a single unit. That unit has a hollow base and a hollow lid. The base and the lid mate to provide an enclosed space for heating food. Heating means are associated with the base, to heat the interior space. Means are provided for lifting the lid relative to the base, and for maintaining the lid at a set position relative to the base. The base is adapted to receive water, so that when it is heated, steam will be formed in the space enclosed by the lid and base. The lower edge of the lid is recessed, and receives in the recess the upper edge of the base, whereby the mating of the two edges provides a junction to maintain steam within the space formed by the lid and base. A mechanism is provided for tilting the base at a predetermined angle, to facilitate the use of the base for grilling or frying foods.

The current state of the art of lids for commercial braising pans (also known as tilting frypans or skillets) is that such lids are typically manufactured from a flat piece of sheet metal folded with no more than a 1-inch apron, welded at the corners. The resulting construction is flimsy, with poor rigidity and frequently will not lie flat on the pan. Typically a handle is attached across the front of the lid to add some stiffening and be used to raise the lid. Notwithstanding the presence of such handles, the generally flimsy nature of the prior art lids allows some twisting to take place from the front across the lid. This twisting action can prove hazardous, since steam may leak out of the lid when the handle is grasped and raised, whereupon the person operating the cooking device may have his/her hand and/or arm burned by the leaking steam.

The prior art lids also frequently make use of a condensate drip shield so that condensation which would tend to run down the lid as it is lifted up is redirected back into the pan. Such shields are typically mechanically fastened or welded to the lid. This arrangement creates a food "trap" where pathogens may collect and makes cleaning more difficult (e.g., the mechanically fastened drip shields must be removed for cleaning). A steam vent also may be included on the lid to allow excess steam to escape when boiling vigorously in the unit. If a vent is not included or the vent is not opened, the steam tends to escape around the complete perimeter of the lid, condense on the cooler metal of the lid's apron and drip to the floor. The wet floor creates a significant slip hazard.

Examples of prior art lids for commercial cooking devices are shown in the following literature: Crown Food Service Equipment Ltd., Model GTS-30 and GTS-40 Gas Tilting Skillet, Crown Food Service Equipment Ltd., Model ELTS-30 and ELTS-40 Electric Tilting Skillet; Vulcan-Hart Co., Model E30TB and E40TB Braising Pans; Market Forge Industries, Inc., Models 30-STEM, 40-STEM, 30-STEL, and 40-STEL UniVerse Tilting Skillets, Market Forge Industries, Inc., Models 30-STGM, 40-STGM, 30-STGL and 40-STGL UniVerse Tilting Skillets; Groen (a Dover Industries company) Model CFPC/2 Braising Pan, Groen (a Dover Industries company) Model HFP/2 Braising Pan, Groen (a Dover Industries company) Model FPC/2 Braising Pan; Cleveland Range, Inc. Models SGL-30-T, SGL-40-T, SGM-30-T and SGM-40-T Gas Tilting Open Base and Modular Skillets, Cleveland Range, Inc. Models SEL-30-T, SEL-40-T, SEM-30-T and SEM-40-T Electric Tilting Open Base and Modular Skillets; Southbend (a Middleby company) Models BEMTS-30 and BEMTS-40 Braising Pans, Southbend (a Middleby company) Models BGMTS-30 and BGMTS-40 Braising Pans, Southbend (a Middleby company) Models BECT-24, BECT-30, and BECT-40 Braising Pans; and Legion Industries, Inc., the assignee of the subject invention, Model TES Tilting Braising Pan, and Legion Industries, Inc. Model TGSM/TGSE Tilting Braising Pan.

In view of the above a need presently exists for a lid for a cooking device and for a cooking device including a lid which overcomes the disadvantages of the prior art.

OBJECTS OF THE INVENTION

Accordingly, it is a general object of this invention to provide a lid for a cooking device, and a cooking device with a lid, which addresses that need.

It is another object of this invention to provide a lid/cooking device which includes a steam vent in the lid to enable excess steam to vent from the cooking device in a safe manner.

It is another object of this invention to provide a lid/cooking device which includes a steam vent in the lid and a convection-cooled peripheral apron for the lid.

It is another object of this invention to provide a lid/cooking device wherein the lid is arranged to be readily raised and lowered by hand.

It is another object of this invention to provide a lid/cooking device wherein the lid is reinforced to prevent or minimize any twisting of it when it is raised.

It is another object of this invention to provide a lid/cooking device wherein the lid includes a drip shield upon which exiting steam may condense and which is located to minimize, if not eliminate, drippage off of it onto the floor where such drippage could present a slip hazard to operating personnel.

It is another object of this invention to provide a lid/cooking device, wherein the lid includes an excess steam vent and a drip shield, which is easy to clean and which does not provide a trap for collection of pathogens.

It is another object of this invention to provide a lid/cooking device which is simple in construction.

SUMMARY OF THE INVENTION

These and other objects of the invention are accomplished by providing a lid for a cooking device and a cooking device having a lid. The cooking device can be any type, e.g., a braising pan, having a cooking chamber in the form of a hollow base including a base wall and sidewalls upstanding from the base wall and which is arranged to support food therein for cooking. Each of the sidewalls of the cooking chamber has a top edge, e.g., the top edge of all of the sidewalls lies in a common plane. The lid for the cooking chamber is arranged to be pivotally mounted with respect to said cooking chamber and movable from a closed, e.g., "down," position to an open, e.g., "up," position, and vice versa. When the lid is in the closed or down position food can be cooked in the chamber. In an open or up position access is provided to the interior of the chamber and any food located therein.

The lid basically comprises a top wall, an apron and a drip shield. The apron projects downwardly from the top wall of the lid along a portion, e.g., the "front" and "sides," of the periphery of the top wall. The drip shield projects upward at an angle to the top wall of the lid along another portion, e.g., the rear, of the periphery of the lid's top wall. The drip shield has a lower free edge which is spaced above the top edge of the cooking chamber when the lid is in the closed position to form a vent for excess steam to exit from the cooking chamber.

The lid's apron forms a convection flow space between it and the sidewalls of the cooking chamber contiguous with the top edge of those sidewalls. The convection flow space is in communication with the excess steam vent, whereupon ambient air may enter between the apron and the sidewalls of the cooking chamber and flow in a convection flow path to cool the apron. Excess steam produced by the operation of the cooking device within the chamber exits directly from the vent and excess steam which leaks out between the interface of the lid and the top edges of the cooking chamber when the lid is down is carried through the convection path to the vent. The drip shield is located immediately adjacent the excess steam vent to enable some of excess steam to condense on the drip shield for collection and removal.

In accordance with one aspect of this invention, the lid includes a pair of side-mounted handles for enabling the lid to be grasped by a user to raise and lower it. In accordance with another aspect of this invention a reinforcing member, e.g., a torque tube, is provided as part of the lid to prevent twisting of the lid when it is raised and lowered. In addition, biasing means, e.g., a spring operated piston, is provided to facilitate raising and lowering of the lid.

DESCRIPTION OF THE DRAWINGS

Other objects and many of the attendant advantages of this invention will become readily appreciated as the same becomes better understood by reference to the following detailed description, when considered in connection with the accompanying drawings, wherein.

DETAILED DESCRIPTION OF THE PREFERRED EMBODIMENT

Figure 1:
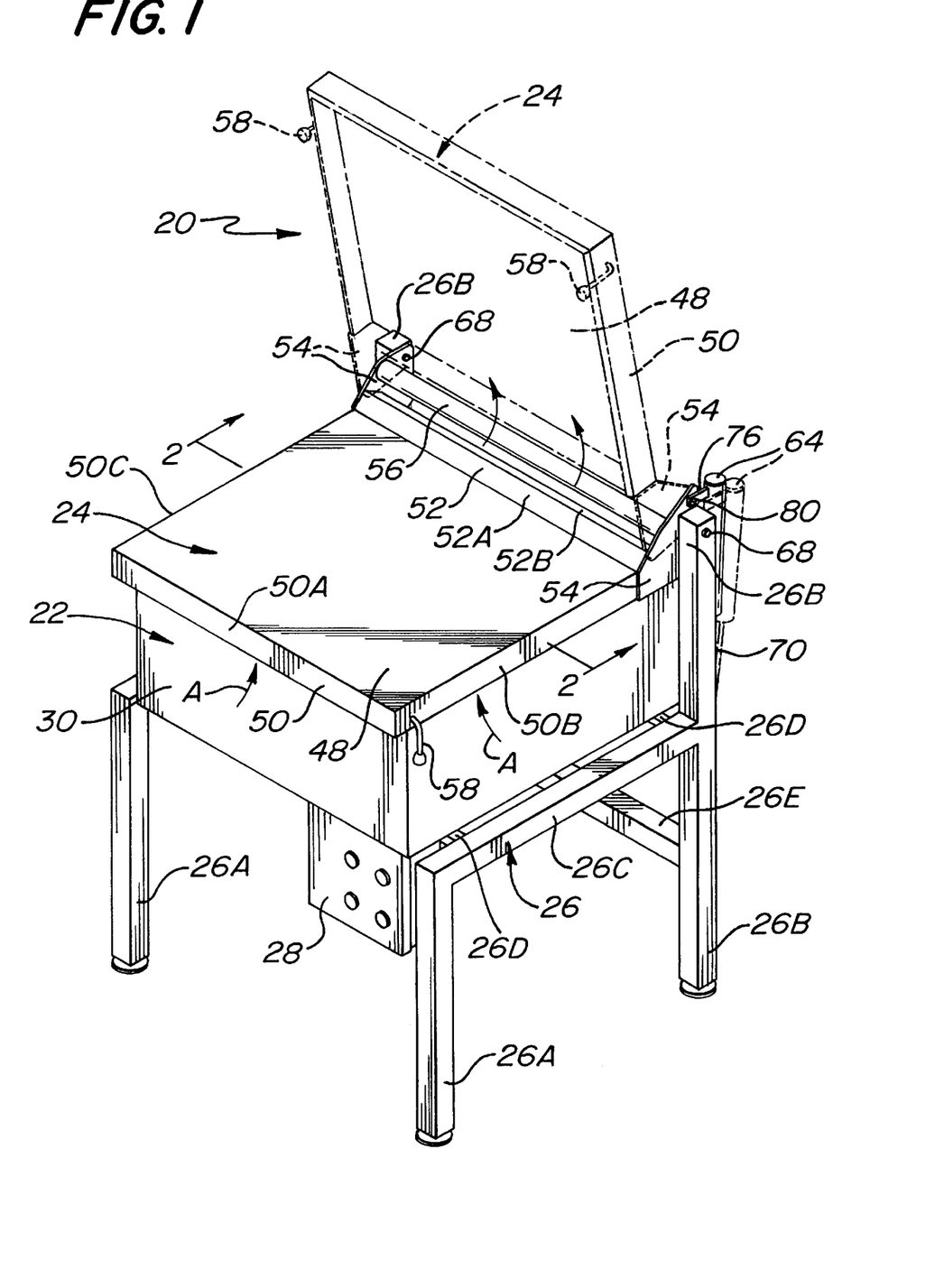
FIG. 1 is an isometric view of a cooking device utilizing the lid of this invention, shown in its closed position, with the lid being shown in its "open" position by use of phantom lines.

Referring now in greater detail to the various figures of the drawing wherein like reference characters refer to like parts, a cooking device embodying the lid of the present invention is shown generally at 20 in FIG. 1. The cooking device 20 basically comprises a base 22 forming a cooking chamber, a lid 24, and a supporting frame 26. The base 22 will be described in detail later, but can be of any suitable construction, e.g., like that disclosed in my heretofore identified patent. The base is supported on the frame 26. The frame 26 basically comprises a pair of front legs 26A, a pair of rear legs 26B, pair of side support sections 26C, a pair of cross support sections 26D, and a rear leg brace section 26E. All of the legs and sections are hollow, square in cross-section and welded together to form an integral unit. The side sections 26C interconnect the top ends respective ones of the front legs 26A and respective middle portions of the respective rear legs 26B. The support sections 26D extend between the two side sections 26C to form a support for the base or cooking chamber 22. The rear brace section 26E is connected between the two rear legs 26B at an elevation approximately mid-way between the bottom of each of the rear legs 26B and the point at which it merges with its associated side section 26C. The portion of the rear legs 26B extending above the respective side sections 26C serve as the means to pivotally mount the lid 24 on the cooking chamber 22 as will be described later.

A control panel or control box 28 is mounted on the outer bottom (to be described later) of the base 22 adjacent one of the front legs 26A. The panel or box contains the various electrical components for effecting the operation of the device 20. For example, the panel includes the various electrical switches, dials, indicator lights, thermostats, etc., of the device 20.

Figure 2:
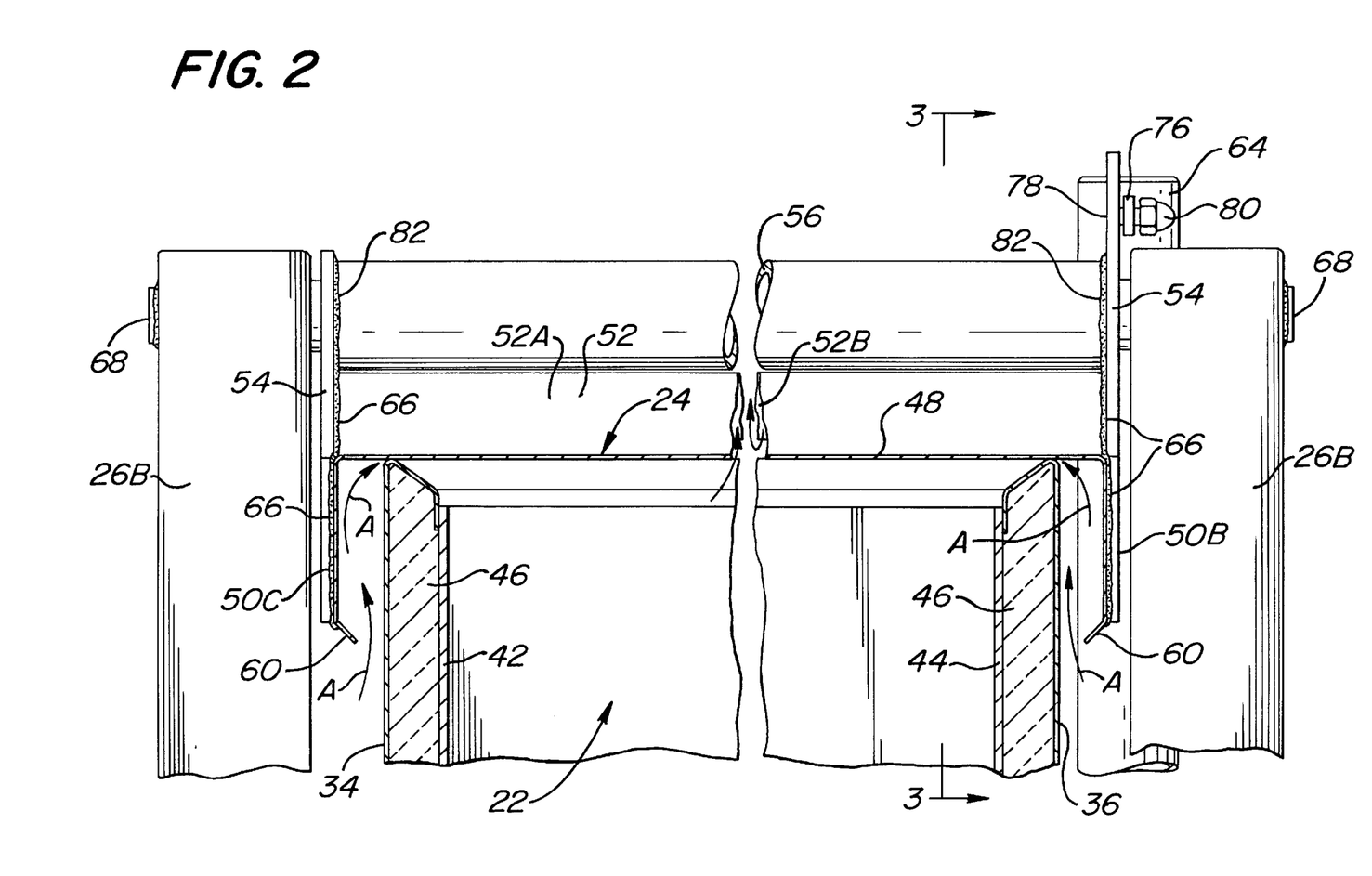
FIG. 2 is an enlarged sectional view taken along the line 2—2 of FIG. 1.
Figure 3:
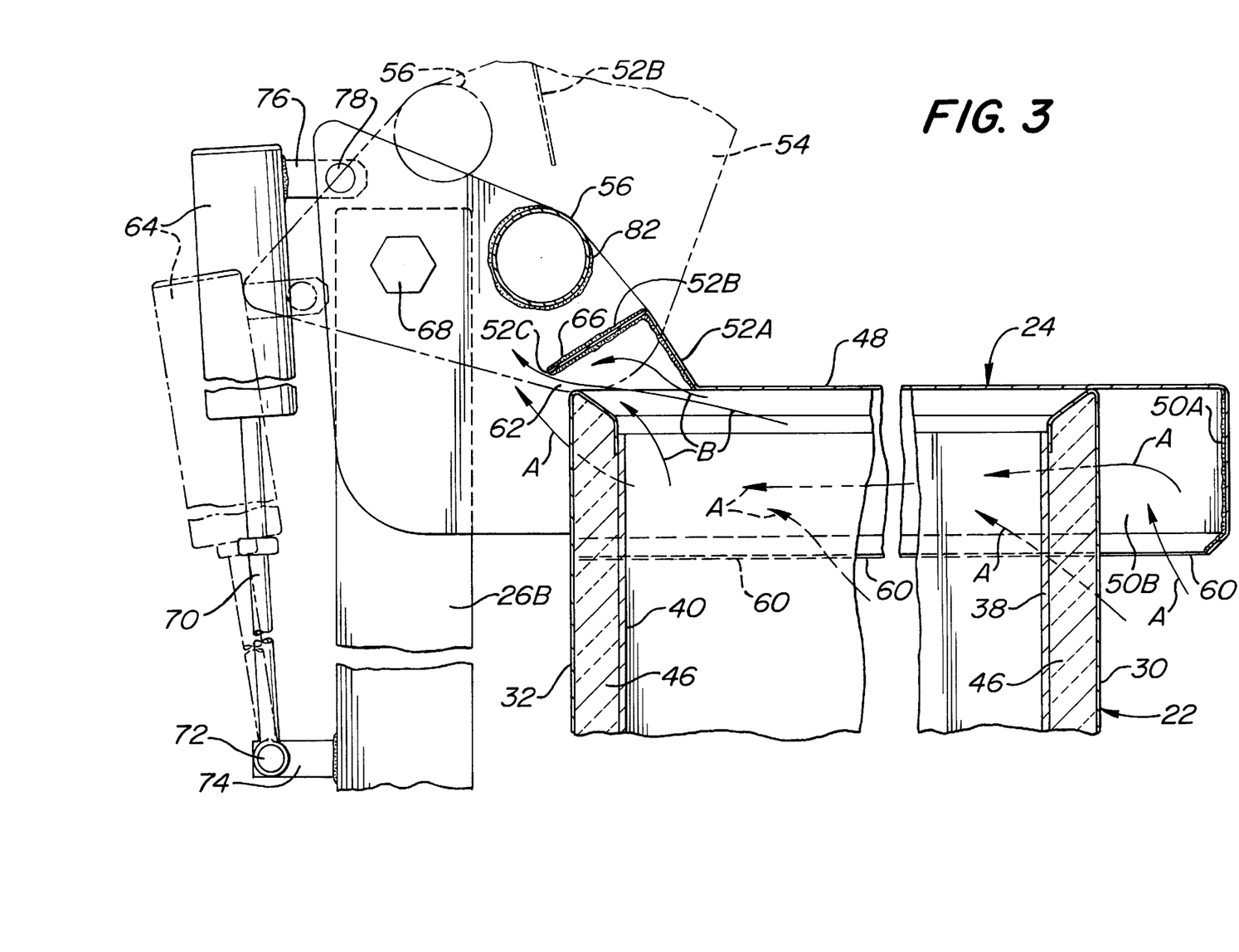
FIG. 3 is a sectional view taken along the line 3—3 of FIG. 2.

The base 22 of the cooking device is a hollow member which is open at its top to form a hollow cooking chamber. In the embodiment shown, that chamber forms a "braising" pan, but such a construction is merely exemplary. As best seen in FIGS. 2 and 3 the cooking chamber includes an outer front wall 30, an outer rear wall 32 and outer side walls 34 and 36. The cooking chamber further includes an inner front wall 38, an inner rear wall 40, inner side walls 42 and 44, an inner bottom wall (not shown) and an outer bottom wall (not shown). The inner and outer walls forming the base's cooking chamber are spaced from one another, with the spaces separating them being filled with insulation 46. That insulation can be any type normally used in cooking devices, such as fiberglass, cellulose, etc.

While not shown in the drawings, a braising plate is located, spaced above and parallel to the inner bottom wall of the base 22. The braising plate is welded to the inner walls 38, 40, 42 and 44 of the cooking chamber to form a liquid tight seal between it and those walls. The underside of the braising plate includes plural resistance heating bars which, when provided with electric current, heat the plate. The braising plate can be formed totally of stainless steel, or, can be formed from another metal that is clad with stainless steel. For example, the base metal can be any heat conductive metal, such as aluminum, copper or steel. The heater bars can be any conventional electrically heatable bars using in heating thermally conductive surfaces. In a preferred embodiment, those bars are formed from nichrome wire sandwiched in sheets of mica. The heat is generated by the nichrome wires, and the mica provides electrical insulation. The heater bars are held against the underside of the braising plate by any suitable means, e.g., leaf springs (not shown).

The base 22 is supported on the frame via the cross bars 26D, i.e., it is welded to the cross bars.

As can be sen in FIG. 1, the lid 24 basically comprises an assembly of a planar top wall 48, an apron 50, a condensate drip shield 52, a pair of pivot plates 54, a torque tube 56 and a pair of safety handles 58. The top wall or cover 48 is a generally planar member of rectangular profile and may be formed of any suitable material, e.g., stainless steel. The apron 50 includes three sections, namely, a front section 50A extending the full width of the front edge of the top panel 48, and a pair of side sections 50B and 50C. The section 50B extends the full length of one of the side edges of the top wall 48, while the section 50C extends along the full length of the opposite edge. Each of the sections 50A, 50B and 50C is in the form of a generally planar strip extending in a plane perpendicular to the plane of the top wall 48 and of a substantial width, e.g., 2 inches (5.1 cms). The free edge of each of the sections 50A, 50B and 50C is designated by the reference number 60 and is in the form of a flange which extends inward at an acute angle, e.g., 45°, to the plane of the apron section from which it extends. The apron with its inward flange or lip 60 provides substantial rigidity to the lid to resist twisting without restricting the cleanability of the lid. The rear edge portion of the top wall 48 forms the condensate drip shield 52. As will be described later, the lower edge of the drip shield 52 is spaced from the top edge of the rear wall of the cooking chamber 22 when the lid is closed to form a steam vent 62 from which steam or other vapors created during the cooking process can exit.

As best seen in FIGS. 2 and 3, the top edge of the outer wall forming the base member cooking chamber lies in a common plane. The planar top panel 48 of the lid is arranged to engage those edges to close off the cooking chamber when the lid 24 is in its down or closed position, as will be described later. This action effectively closes off the interior of the cooking chamber. However, some steam or other vapors produced during the cooking process and which do not directly exit the steam vent 62 may exit the cooking chamber through the interface of the inner surface of the top wall 48 of the lid and the top edge of the cooking chamber. As will be described in detail later, any such exiting steam will be channeled by a convection flow path along the periphery of the apron and back to the steam vent 62. Thus, the peripherally exiting steam will not condense on the apron, where it could drip off onto the floor to create a slippage hazard. Moreover, the convection flow will tend to cool the apron, thereby minimizing, if not, eliminating the danger of a person being burned upon contact with the apron.

The width of the lid, that is, the width of the top panel 48, is slightly greater than the spacing between the outer walls 34 and 36 of the cooking chamber. Accordingly, a passageway for the convection flow of air and cooking vapors is created between the inner surface of the apron and the underlying outer wall of the cooking chamber. In a similar manner, the length of the lid, that is, the length of the top panel 48 is greater than the distance between the front outer wall 30 and the rear outer wall 32 so that the front section 50A of the apron 50 overhangs the outer front wall 30 thereby creating a convection passageway between the inner surface of that apron section and the front wall. The passageway between the front apron section 50A and the outer front wall of the cooking chamber is in communication with the convection passageways extending along each of the side apron sections 50B and 50C and their respective underlying side wall sections 34 and 36.

The side convection passageways terminate at their ends at the rear of the lid and under the condensate drip shield 52. The respective ends of the side convection passageways are in communication with and form part of the excess steam vent 62. As can be seen in FIGS. 1–3, air is enabled to flow under the lip 60 of the apron and down its communicating convection passageways in the direction of arrows A to the vent 62 to vent to the ambient atmosphere.

The condensate drip shield is best seen in FIG. 3 and comprises a generally V-shaped member having a first strip section 52A and a second or free edge strip section 52B. The section 52A is an elongated planar strip extending the full width of the top panel 48 of the lid and in a plane at an acute angle thereto. The portion 52B is a similarly shaped strip also extending the full width of the top panel 48 of the lid but extending in a plane approximately perpendicularly to the portion 52A. The portion 52B includes a lower free edge 52C. The free edge 52C of the condensate drip shield is located spaced slightly over the top edge of the rear outer wall 32 of the cooking chamber when the lid is in the closed position shown in FIG. 3. Moreover, the free edge 52C hangs slightly to the rear of the rear wall 32. The gap or space between the free edge 52C and the top edge of the rear wall 32 forms the excess steam vent 62. As mentioned earlier, the ends of the steam vent 62 are in fluid communication with the interior of the convection passageways extending down the respective sides of the lid between the apron and the sidewalls of the cooking chamber.

As can be seen in FIG. 3, steam or other vapor created during the cooking process within the cooking chamber is able to flow in the direction of the arrows B under the condensate drip shield 52 and directly out through the vent 62. Any liquid condensing on the shield can drip either back into the cooking chamber or off the free edge lip 52C for collection therefrom. To that end, a condensate trap or trough (not shown) is preferably mounted on the rear outer wall 32 of the base 22 to collect any liquid drops falling from the free edge of the condensate drip shield. The collected liquid in the trap is enabled to flow via a conduit (not shown) coupled to the trap to any suitable means for collecting the liquid.

As should be appreciated by those skilled in the art, since the steam vent 62 is at a higher elevation than the free edge or lip 60 of the apron, any air which can flow under the lip 60 will follow the convection path from the lower cooler entrance area to the higher hotter area contiguous with the steam vent 62. Accordingly, any steam or vapors which may tend to exit through the interface of the top edge of the outer walls of the cooking chamber and the under surface of the lid's top wall will be carried by the convection air flow down the passageways and through the ends of the excess steam vent 62. This convection flow will necessarily have the effect of cooling the apron of the lid. This feature is of considerable importance since it lessens the chance of operating personnel being burned upon contact with the peripheral edge of the lid. The convection flow will also tend to prevent the build-up of any condensate on the lid either at its front apron section or side apron sections. This feature is also of considerable importance since any condensate buildup along either the front apron section or side apron sections could drip off onto the floor and thereby cause a slipping hazard to operating personnel. Thus, the only place where steam produced by the cooking operation will tend to condense will be on the inner surface of the top panel of the lid within the confines of the outer walls of the cooking chamber, on the under surface of the drip shield 52, on the outer surface of the drip shield section 52B and on the outer surface of the torque tube 56 which is located adjacent the drip shield (as will be described later). The trap or trough (not shown) which is mounted on the rear wall 32 of the cooking chamber extends sufficiently far, e.g., one inch, therebeyond to serve to collect any liquid that drips off either the drip shield 52 or the torque tube 56.

The means for mounting the lid 24 with respect to the base 22 comprises the heretofore identified pivot plates 54 and associated actuators 64. As can be seen, each of the pivot plates is a relatively thick planar member of a somewhat wedge shape, formed of any suitable material, e.g., stainless steel. Each plate is fixedly secured to a respective side of the lid 24. In particular, one of the plates 54 is welded to the apron side section 50B contiguous with the condensate drip shield 52 along a weld seam 66. The weld seam also extends along the edge of the sections 52A and 52B making up the drip shield. In a similar manner, the side 50C of the apron 50 is welded via a seam 66 to the other plate 54 and the edge of the condensate drip shield contiguous with that side section 50C is also welded to that plate via a weld line 66. Each of the plates 54 includes an opening (not shown) through which a bolt 68 extends. One of the bolts passes through an opening (not shown) in one of the rear legs 26B at the upper end thereof, as shown in FIG. 1, to pivotally secure the lid on that side to the frame 26. The other plate 54 is mounted on the upper end of the other leg 26B in a similar manner. The bolts 58 are axially aligned so that they form a pivot axis about which the lid can be rotated from the closed position shown in solid lines in FIG. 2 to the open or up position shown by phantom lines in FIG. 1, and vice versa.

In order to facilitate the raising and lowering of the lid, the heretofore identified actuators 64 are provided. Each actuator is in the form of a spring-biased piston located within a cylindrical hollow housing. A piston rod 70 extends from each piston. The free end of each piston rod 70 is connected via a pin 72 to a tab 74 projecting outward from the rear of the upper portion of respective ones of the rear leg 26B. The upper end of each cylinder includes a tab 76 fixedly secured thereto. The free end of the respective tabs 76 includes an opening through which a respective pivot pin 78 extends. The pins 78 are secured to respective apex portions of the respective pivot plates 54. Each pivot pin 78 is offset from the axis of its associated bolt 68. A cap nut 80 is disposed on the free end of each pin to complete the pivotal connection of the actuator to the lid. A compression spring (not shown) is located within the housing of the actuator 64 and surrounding the rod 70. One end of the spring bears against a disk (not shown) within that actuator housing threadedly secured to one end of the rod. The other end of the spring makes contact with a wall of the housing. While the spring tends to bias the piston so that the actuator is in the phantom position shown in FIG. 3, whereupon the lid will assume the open position, the weight of the lid is such as to prevent it from automatically assuming that open position. However, the bias provided by the actuator is enough to provide substantial assistance in lifting the lid. Moreover, the geometry of the pivot points established by the bolt 68 and the pin 78 coupled with the weight of the lid and the tension provided by the spring of the actuator enables the lid to be maintained at various positions between the fully closed position and the fully open position.

The means for raising and lowering the lid comprise the heretofore identified safety handles 58. As can be seen best in FIG. 1, the handles 58 are mounted on opposed side sections 50B and 50C of the lid's apron closely adjacent the front section 50A of the apron.

As should be appreciated by those skilled in the art, the apron 50 with its annularly peripheral lip 60 has the effect of reinforcing or giving rigidity to the lid. The relatively thick pivot plates 54 at the rear of both sides of the lid also tend to provide rigidity to that member. The torque tube 56 also provides an additional measure of rigidity to the lid. To that end, the torque tube comprises a metal, e.g., stainless steel, tube which extends between the two pivot plates 54 and is welded at each of its ends 82 to those plates. The torque tube is spaced by a small distance from the condensate drip shield 52 to enable a person to place his/her fingers therebetween to clean the condensate shield and the torque tube.

The rigidity of the lid insures that when it is lifted by either of its handles, it does not twist. If it could twist, as is the case of prior art devices, steam could exit from the front portion of the lid and possibly burn the hand of the person lifting the lid.

It should be pointed out at this junction that the lid and/or cooking device of this invention can be made from any materials generally used for cooking devices, and not necessarily stainless steel. Moreover, the cooking device can incorporate any type of heaters, e.g., resistance heaters, gas burners, etc. or combinations thereof.

As should be appreciated from the foregoing description, the primary strength and rigidity for the lid of this invention is provided by the welded reinforcing assembly at the rear of the lid where the maximum stresses occur and where significant strength is required. The reinforcing assembly comprises the torque tube, the pivot plates with pivot points for raising the lid, and a counterbalancing actuator which assists in raising the lid. This construction allows a minimal amount of welding while providing an extremely strong assembly. In effect, the cover is cantilevered on a very strong structure used to raise and lower the lid while keeping it flat. It must be pointed out that other means can be used to reinforce the lid in lieu of the torque tube and associated components shown and described above.

The condensate drip shield forms a significant part of the lid and is preferably formed with bends in the lid to provide a seamless, "box" construction across the complete width of the cooking chamber, e.g., braising pan, thereby adding significant strength and rigidity to the lid. Other salient features provided by the lid's construction are that excess steam is effectively and safely removed (a steam vent is formed across the full width of the lid by the lower edge of the drip shield bend above the cooking chamber's top edge), areas for pathogen growth are eliminated (there are no seams or connectors between the drip shield and the lid itself which could provide pathogen growing crevices), and the lid may be easily cleaned (the space between the drip shield and the torque tube allows full access with the hand to clean both).

As mentioned earlier, the apron around the front and two sides of the lid extends beyond the periphery of the base and down a substantial distance, e.g., approximately 2 inches, to allow space for airflow. The bend (e.g., 45° lip or flange) in the lower edge of the apron increases the lid's strength significantly, without restricting its cleanability. The steam vent at the rear of the lid being at a higher elevation than the interior of the apron between it and the contiguous sidewalls of the cooking chamber creates the heretofore described convection flow path, preventing steam from exiting from the sides of the lid by directing steam toward the rear and out the steam vent, while also cooling the lid's apron to minimize the chance of a person burning himself/herself upon contact with the apron.

As described above a pair of small handles are provided on the side of the lid for the purpose of safely raising the lid. While two such handles are shown and described, the lid can make use of only a single handle, if desired. The subject invention enables one to use a small handle located on the side of the lid instead of an elongated, rigidifying, handle extending across the full width of the front of the lid as has characterized much of the prior art. The use of a side-mounted handle(s) provides an arrangement which minimizes the chance of a person being burned by steam exiting from the cooking device when the lid is raised. In particular, by locating the handle(s) on the side(s) of the lid the subject invention keeps the operator's hands and arms "out of harm's way" of steam exiting from the cooking chamber at the front when the lid is raised. A further advantage of a lid having one or more side-mounted handles is that such handles will not interfere with cleaning of the cooking device, yet can be easily reached.

Without further elaboration, the foregoing will so fully illustrate my invention that others may, by applying current or future knowledge, readily adapt the same for use under various conditions of service.

I claim:

1. A lid for a cooking device having a cooking chamber in the form of a hollow base including abase wall and sidewalls upstanding from the base wall, each of the sidewalls of the cooking chamber having a top edge, said lid being arranged to be pivotally mounted with respect to said cooking chamber and movable from a closed position to an open position and vice versa, said lid having a top wall, an apron projecting downwardly from said top wall along a portion of the periphery of said top wall, and a drip shield projecting upward at an angle to said top wall along another portion of the periphery of said top wall, said drip shield having a lower free edge spaced above the top edge of the cooking chamber when said lid is in said closed position to form a vent for excess steam to exit from the cooking chamber, said apron forming a convection flow space between it and the sidewalls of the cooking chamber contiguous with the top edge of the sidewalls of the cooking chamber, said convection flow space being in communication with said vent, whereupon air may enter between said apron and the sidewalls of the cooking chamber and flow in a convection flow path to cool said apron, with excess steam produced by the operation of said cooking device being carried through said vent, and with a portion of said excess steam being enabled to condense on said drip shield for collection and removal.

2. The lid of claim 1 wherein said lid includes a rear portion along which said drip shield extends, said lid being pivotally mounted to the cooking chamber adjacent said rear portion.

3. The lid of claim 2 wherein said drip shield comprises a generally V-shaped member including a first panel extending upward at an angle to said top wall of said lid, and a second panel extending downward at an angle from said first portion and terminating in said lower free edge, said lower free edge extending outward and overhanging the adjacent sidewall of the cooking chamber.

4. The lid of claim 1 wherein said apron includes a free edge in the form of an inwardly angularly directed lip.

5. The lid of claim 4 wherein said free edge extends at an angle of approximately 45 degrees to said apron.

6. The lid of claim 1 additionally comprising handle means mounted on said apron for enabling a user to raise said lid to said open position and to lower said lid to said closed position with respect to the cooking chamber.

7. The lid of claim 6 additionally comprising biasing means for assisting in the raising and lowering of said lid.

8. The lid of claim 1 additionally comprising a reinforcing member to prevent twisting of said top wall of said lid.

9. The lid of claim 8 wherein said lid includes a rear portion and wherein said reinforcing member comprises a torque tube extending along the length of said rear portion of said lid and spaced from said drip shield to enable the cleaning of said drip shield.

10. The lid of claim 1 wherein said drip shield and said top wall are formed as an integral member having an inner surface which is easily cleanable and does not include any crevices for collection of pathogens.

11. The lid of claim 9 wherein said lid is of rectangular shape having a front section and a pair of opposed side sections and a pair of handles for raising said lid to said open position and lowering said lid to said closed position, said pair of handles being mounted on respective ones of said side sections of said apron.

12. A cooking device having a cooking chamber and a lid, said cooking chamber being in the form of a hollow base including a base wall, and sidewalls upstanding from said base wall, each of said sidewalls of said cooking chamber having a top edge, said lid being arranged to be pivotally mounted with respect to said cooking chamber and movable from a closed position to an open position and vice versa, said lid having a top wall, an apron projecting downwardly from said top wall along a portion of the periphery of said top wall, and a drip shield projecting upward at an angle to said top wall along another portion of the periphery of said top wall, said drip shield having a lower free edge spaced above said top edge of said cooking chamber when said lid is in said closed position to form a vent for excess steam to exit from said cooking chamber, said apron forming a convection flow space between it and said sidewalls of said cooking chamber contiguous with said top edge of said sidewalls of said cooking chamber, said convection flow space being in communication with said vent, whereupon air may enter between said apron and said sidewalls of said cooking chamber and flow in a convection flow path to cool said apron, with excess steam produced by the operation of said cooking device being carried through said vent, and with a portion of said excess steam being enabled to condense on said drip shield for collection and removal.

13. The cooking device of claim 12 wherein said lid includes a rear portion along which said drip shield extends, said lid being pivotally mounted to said cooking chamber adjacent said rear portion.

14. The cooking device of claim 13 wherein said drip shield comprises a generally V-shaped member including a first panel extending upward at an angle to said top wall of said lid, and a second panel extending downward at an angle from said first portion and terminating in said lower free edge, said lower free edge extending outward and overhanging an adjacent sidewall of said cooking chamber.

15. The cooking device of claim 1 wherein said apron includes a free edge in the form of an inwardly angularly directed lip.

16. The cooking device of claim 15 wherein said free edge extends at an angle of approximately 45 degrees to said apron.

17. The cooking device of claim 12 additionally comprising handle means mounted on said apron for enabling a user to raise said lid to said open position and to lower said lid to said closed position with respect to the cooking chamber.

18. The cooking device of claim 17 additionally comprising biasing means for assisting in the raising and lowering of said lid.

19. The cooking device of claim 12 additionally comprising a reinforcing member to prevent twisting of said top wall of said lid.

20. The cooking device of claim 19 wherein said lid includes a rear portion along which said drip shield extends, and wherein said reinforcing member comprises a torque tube extending along the length of said rear portion of said lid.

21. The cooking device of claim 20 wherein said torque tube is located spaced closely adjacent said drip shield.

22. The cooking device of claim 12 wherein said drip shield and said top wall are formed as an integral member having an inner surface which is easily cleanable and does not include any crevices for collection of pathogens.

23. The cooking device of claim 12 wherein said lid is of rectangular shape having a rear portion and wherein said cooking chamber is of rectangular shape with one of said sidewalls of the cooking chamber forming a rear wall.

24. The cooking device of claim 23 wherein lid includes a pair of handles for raising said lid to said open position and lowering said lid to said closed position, and wherein said apron comprises a front section and a pair of opposed side sections, said pair of handles being mounted on respective ones of said side sections of said apron.

* * * * *